UNITED STATES PATENT OFFICE.

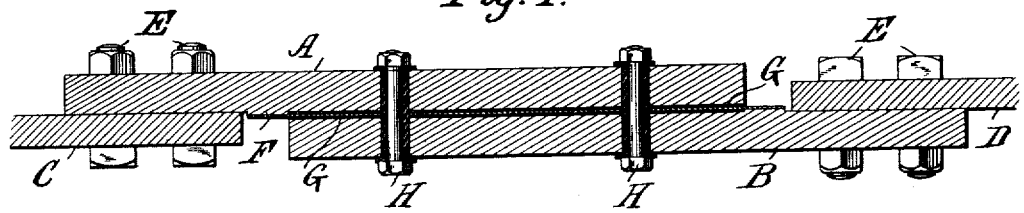
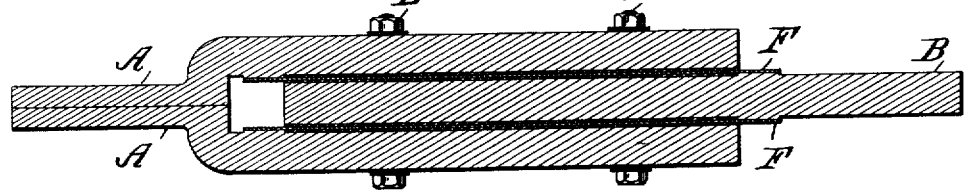

ADELBERT O. BENECKE, OF NEWARK, NEW JERSEY, ASSIGNOR TO AMERICAN INSTRUMENT COMPANY, A CORPORATION OF NEW JERSEY.

SHUNT FOR ELECTRICAL MEASURING INSTRUMENTS.

No. 845,996. Specification of Letters Patent. Patented March 5, 1907.

Application filed December 9, 1905. Serial No. 291,073.

*To all whom it may concern:*

Be it known that I, ADELBERT O. BENECKE, of Newark, Essex county, New Jersey, have invented a new and useful Improvement in Shunts for Electrical Measuring Instruments, of which the following is a specification.

My invention consists in a shunt for an electrical measuring instrument which is intended to be left permanently in circuit. In shunts of this character difficulty is met with in the overheating of the resistance-plates, and my specific invention has to do with means for keeping this tendency to overheat at a minimum.

In carrying out my invention I make use of the structures illustrated in the accompanying drawings, in which—

Figure 1 is a sectional view of the simplest form of my invention. Fig. 2 is a like view of a modified form, and Fig. 3 is a side view of a built-up terminal of another modified form.

A and B are the shunt-terminals, to which the ends C and D of the main are secured by means of the bolts E E. These shunt-terminals A and B are of relatively large masses of metal, preferably of high heat conductivity, and, as shown, overlap each other for the greater portion of their length. The plate F, of high-resistance metal, is secured to each of the terminals, respectively, just outside of their overlapping portions. Insulating material G of any suitable character, preferably thin sheets of mica, separate the plate F on either side from the overlapping portions of the terminals.

In order to permanently secure the parts together in fixed relation, I provide the insulated bolts H, passing through both terminals and the plate F, as shown.

Where a single plate, as shown in Fig. 1, is found insufficient to carry the current, I may increase the number of plates by increasing the terminal elements, as indicated in Figs. 2 and 3, it being understood in each case that the plates are insulated from the overlapping parts of the terminals and held together by the insulated bolts E' and have their ends connected, respectively, to said terminals, as shown.

The shunt-terminals are provided with binding-screws (not shown in the drawings) for the connection of a suitable measuring instrument, and inasmuch as the difference in potential between these binding-screws is proportionate to the current strength passing through the shunt, indications of the measuring instrument can be calibrated to give a direct measurement of the total current passing through the shunt. As heretofore stated, difficulty is met with in this class of instruments in the overheating of the resistance-plates which connect the terminals. By bringing all parts of the resistance-plates F in close contiguity to the overlapping ends of the shunt-terminals I am enabled to take advantage of the heat conductivity of the massive terminal in a greater and more positive degree than has hitherto been possible, and therefore permit the terminals to absorb the heat generated in the said plates by the passage of the current therethrough.

I claim—

1. In a shunt for electrical measuring instruments, two overlapping blocks or masses of conducting material, a plate of resistance material located between the overlapping portions of said blocks and connected thereto.

2. In a shunt, a pair of overlapping shunt-terminals composed of masses of conducting material, a conducting-plate of high-resistance material lying between and insulated from the overlapping portions of said terminals, and connected to said terminals.

3. In a shunt, a pair of overlapping shunt-terminals, composed of relatively large masses of conducting material, a conducting-plate of high-resistance material lying between the overlapping portions of said terminals, insulating material separating said plate from said overlapping portions, the ends of said plate being in electrical connection respectively with said shunt-terminals.

4. In a shunt, a pair of overlapping shunt-terminals composed of relatively large masses of conducting material, two or more high-resistance conductors, connected with said terminals, said conductors lying between and insulated from said overlapping portions.

5. A shunt composed of two separate series of overlapping bars forming the shunt-terminals, a series of high-resistance conductors connected respectively to each of said shunt-terminals, and lying between their overlapping portions insulating materials separating said plates from the overlapping portions of said terminals.

6. In a shunt for electrical measuring instruments, two overlapping blocks or masses of conducting material, a plate of resistance material located between the overlapping portions of said blocks and connected thereto, and means for rigidly securing said parts together.

7. In a shunt for electrical measuring instruments, a pair of overlapping shunt-terminals composed of masses of conducting material, a conducting-plate of high-resistance material lying between and insulated from the overlapping portions of said terminals and connected to said terminals, and means for securing said overlapping portions together.

8. In a shunt for electrical measuring instruments, a pair of overlapping shunt-terminals composed of relatively large masses of conducting material, a conducting-plate of high-resistance material lying between the overlapping portions of said terminals, insulating material separating said plate from said overlapping portions, the ends of said plate being in electrical connection respectively with said shunt-terminals and means for securing said terminals in relatively fixed position.

9. In a shunt for electrical measuring instruments, a pair of overlapping shunt-terminals composed of relatively large masses of conducting material, two or more high-resistance conductors connected with said terminals, said conductors lying between and insulated from said overlapping portions, and means for securing said terminals in relatively fixed position.

10. A shunt for electrical measuring instruments composed of two separate series of overlapping bars forming the shunt-terminals, a series of high-resistance conductors connected respectively to each of said shunt-terminals and lying between their overlapping portions, insulating material separating said plates from the overlapping portions of said terminals, and means for securing said terminals in relatively fixed position.

This specification signed and witnessed this 6th day of December, 1905.

ADELBERT O. BENECKE.

Witnesses:
WILLIAM J. BREWER,
LOUIS M. SANDERS.